United States Patent Office 3,000,939
Patented Sept. 19, 1961

---

3,000,939
N-NITRO,N,N'-BIS(TRINITROALKYL)-UREA
Milton B. Frankel, Pasadena, Calif., assignor to Aerojet-General Corporation, Azusa, Calif., a corporation of Ohio
No Drawing. Filed July 8, 1957, Ser. No. 670,853
10 Claims. (Cl. 260—553)

This invention relates to new compositions of matter and a method for their preparation. In particular this invention relates to nitroureas having the general formula:

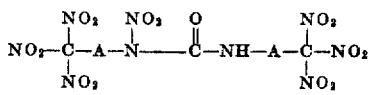

wherein A is an alkylene radical.

This application is a continuation-in-part of my copending U.S. patent application Ser. No. 423,539, filed April 15, 1954, now abandoned.

These compounds are prepared by reacting the corresponding nitroalkyl ureas with nitric acid, in accordance with the general reaction scheme set forth below:

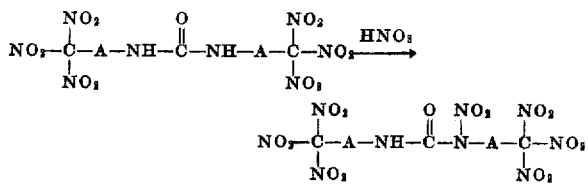

wherein A is an alkylene radical.

The nitroalkyl ureas used as starting materials in this invention are prepared by condensing isocyanates with tertiary alcohols, as disclosed in my copending application No. 423,537, filed April 15, 1954, now abandoned.

To more clearly illustrate my invention, the following example is presented. It is to be understood, however, that this example is presented merely as a means of illustration and is not intended to limit the scope of the invention in any way.

EXAMPLE I

*Preparation of N-nitro-bis-(3,3,3-trinitropropyl) urea*

Ten ml. of 100% nitric acid was placed in a 100 ml. 3-necked flask, fitted with a mechanical stirrer, thermometer, and addition funnel. The flask was cooled in an ice bath and 10 ml. of acetic anhydride was added dropwise, followed by 1.4 gm. of bis(3,3,3-trinitropropyl) urea. The solution was stirred for 15 minutes and poured onto ice. A yellow oil was formed which crystallized on standing. The cream-colored solid was collected, washed with water, and dried in vacuo. The yield of N-nitro-bis-(3,3,3-trinitropropyl) urea was 1.6 gm., M.P. 75°–78° C. The product was treated with hot chloroform and charcoal and a small amount of oil separated. The solution was decanted from the oil and on cooling a white solid separated, M.P. 78°–79° C., impact stability 25–30 cm./2 kg. Another recrystallization from chloroform did not change the melting point. The elemental analysis of the product is as follows:

Calculated for $C_7H_9N_9O_{15}$: percent C, 18.31; percent H, 1.98; percent N, 27.45. Found: percent C, 18.44; percent H, 1.95; percent N, 27.15.

The heat of combustion for this compound was calculated to be 1944 cal./gm. and found to be 1917 cal./gm. The explosives values of the compound were found to be:

Lead block value _____ 166    T.N.T.=100
Ballistic mortar value _____ 148    T.N.T.=100

I have also found that polynitroalkyl ureas such as bis-(4,4,4-trinitrobutyl) urea, bis-(5,5,5-trinitropentyl) urea, and bis-(6,6,6-trinitrohexyl) urea readily react with nitric acid to produce the corresponding nitroureas, namely, N-nitro-bis-(4,4,4-trinitrobutyl) urea, N-nitro-bis-(5,5,5-trinitropentyl) urea, and N-nitro-bis-(6,6,6-trinitrohexyl) urea.

It is apparent that any member of this series of substituted nitroureas disclosed may be prepared by merely selecting the appropriate nitroalkyl urea and reacting it with nitric acid, in accordance with the teachings of this invention.

The nitro compounds of this invention are useful as high explosives and can be used in any conventional explosive missile, projectile, rocket, or the like, as the main explosive charge. An example of such a missile is disclosed in U.S. Patent No. 2,470,162, issued May 17, 1949. One way of using the high explosives in a device such as that disclosed in U.S. Patent No. 2,470,162 is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time-fuse mechanism firing a detonating explosive such as lead azide or mercury fulminate.

Reaction temperatures are not critical in the practice of my invention. Although it is preferred for reasons of convenience to employ reduced temperatures, both higher and lower temperatures can be used to prepare the new compositions of my invention without affecting the course of the reaction.

I claim:

1. As composition of matter, the nitroureas having the formula:

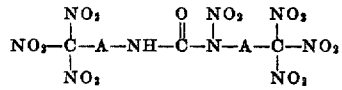

wherein A is a lower alkylene radical.

2. As a composition of matter, N-nitro-bis-(3,3,3-trinitropropyl) urea having the structural formula:

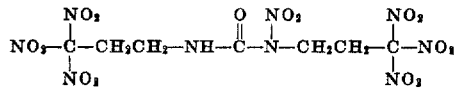

3. As a composition of matter, N-nitro-bis-(4,4,4-trinitrobutyl) urea having the structural formula:

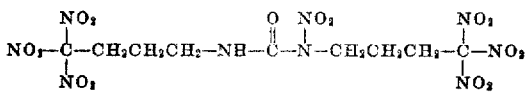

4. As a composition of matter, N-nitro-bis-(5,5,5-trinitropentyl) urea having the structural formula:

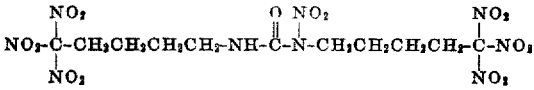

5. As a composition of matter, N-nitro-bis-(6,6,6-trinitrohexyl) urea having the structural formula:

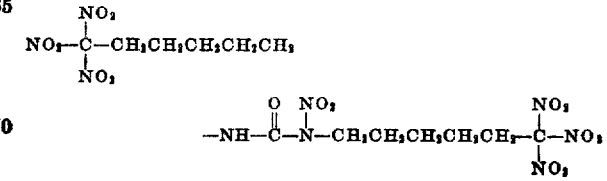

6. The method of preparing nitroureas having the formula:

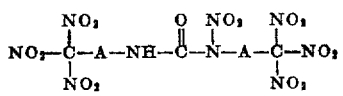

which comprises reacting nitric acid with a nitroalkyl urea having the formula:

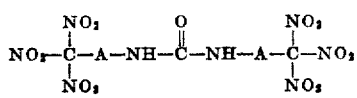

wherein A is a lower alkylene radical.

7. The method of preparing N-nitro-bis-(3,3,3-trinitropropyl) urea which comprises reacting bis-(3,3,3-trinitropropyl) urea with nitric acid.

8. The method of preparing N-nitro-bis-(4,4,4-trinitrobutyl) urea which comprises reacting bis-(4,4,4-trinitrobutyl) urea with nitric acid.

9. The method of preparing N-nitro-bis-(5,5,5-trinitropentyl) urea which comprises reacting bis-(5,5,5-trinitropentyl) urea with nitric acid.

10. The method of preparing N-nitro-bis-(6,6,6-trinitrohexyl) urea which comprises reacting bis-(6,6,6-trinitrohexyl) urea with nitric acid.

References Cited in the file of this patent
UNITED STATES PATENTS 2,731,460    Schenck et al. _____ Jan. 17, 1956
2,950,312    Quadflieg et al. _____ Aug. 23, 1960